United States Patent [19]

Danielson

[11] Patent Number: 5,711,495
[45] Date of Patent: Jan. 27, 1998

[54] DEPLOYMENT CONTROL FOR INFLATABLE ESCAPE SLIDE

[75] Inventor: Leibert K. Danielson, Scottsdale, Ariz.

[73] Assignee: The B.F.Goodrich Company, Akron, Ohio

[21] Appl. No.: 581,954

[22] Filed: Jan. 2, 1996

[51] Int. Cl.[6] .................................................. B64D 25/00
[52] U.S. Cl. ........................... 244/137.2; 244/118.5; 244/905; 242/421; 242/550
[58] Field of Search ........................ 244/137.2, 118.5, 244/905, 190, 152, 146; 242/423.2, 423.1, 423, 396.9; 52/2.11, 2.13, 2.14, 2.1

[56] References Cited

U.S. PATENT DOCUMENTS

| 1,239,082 | 9/1917 | Cary | 242/423.2 |
|---|---|---|---|
| 1,616,833 | 2/1927 | Stremel | 242/396.9 |
| 1,798,137 | 3/1931 | Beck | 244/137.2 |
| 3,018,867 | 1/1962 | Heyniger | 244/137.2 |
| 3,606,939 | 9/1971 | Summer et al. | 244/905 |
| 3,771,749 | 11/1973 | Smialowicz | 244/137.2 |
| 3,860,984 | 1/1975 | Fisher | 182/48 |
| 3,897,861 | 8/1975 | Miller et al. | 244/137.2 |
| 3,944,023 | 3/1976 | Fisher | 182/48 |
| 4,246,980 | 1/1981 | Miller | 244/137.2 |
| 4,460,062 | 7/1984 | Fisher | 182/48 |
| 4,564,411 | 1/1986 | Holzer | 242/423 |
| 4,567,977 | 2/1986 | Fisher | 193/25 B |
| 5,544,839 | 8/1996 | Burch | 242/423 |

Primary Examiner—Andres Kashnikow
Assistant Examiner—Tien Dinh
Attorney, Agent, or Firm—Joseph Januszkiewicz

[57] ABSTRACT

A deployment control for an inflatable escape slide for use in a structure such as an aircraft is disclosed wherein the escape slide has an inboard end and an toe end. The inboard end of the slide is suitably attached to an egress on the structure for deployment and extension of the slide by inflation means whereby the slide extends from an elevated egress to a ground support. The slide has inflatable tubes with a slide surface. The inflation means is operative upon actuation to provide pressurized fluids to the tubes which will inflate and distend the tubes into a longitudinally extending escape slide under the control of a restraining control device (or devices). Such device is operative upon pressurization of the tubes to deploy an outboard portion of the slide to which one end of the device is connected to move relative to the inboard end of the slide to which the other end of the device is connected at a controlled rate for a predetermined length of the slide.

19 Claims, 6 Drawing Sheets

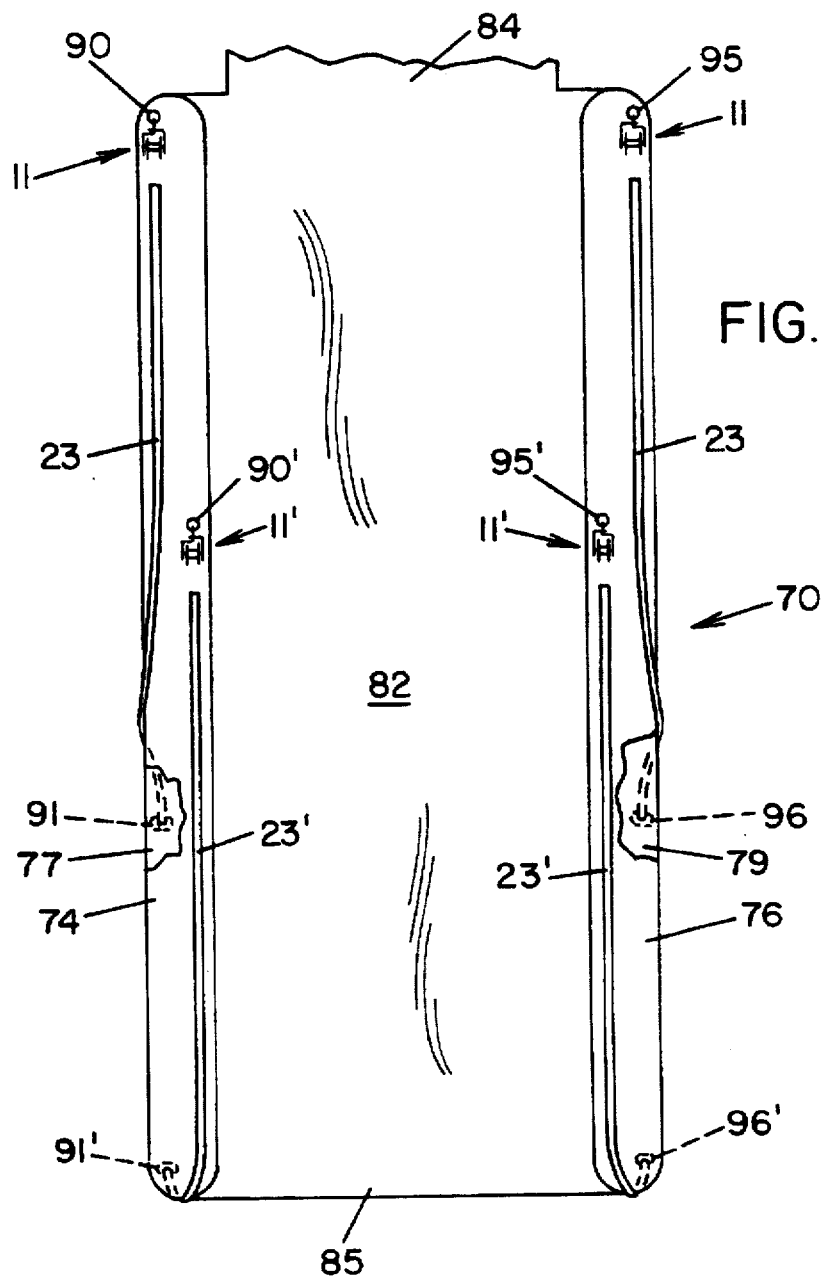
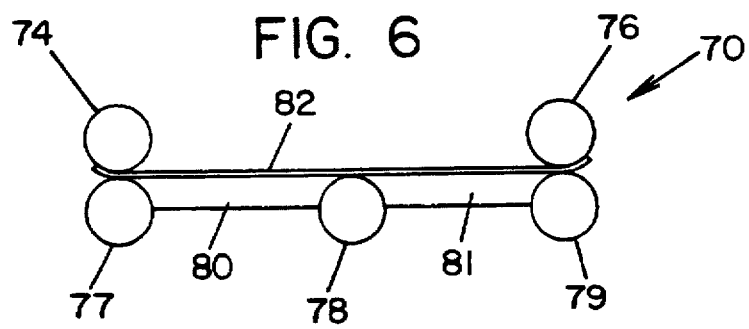

DEPLOYMENT CONTROL FOR INFLATABLE ESCAPE SLIDE

BACKGROUND OF THE INVENTION

This invention relates to an inflatable emergency escape slide and more particularly to a new and improved escape slide restraint system for more accurately controlling the deployment of an escape slide by use of a friction braking means.

In the case of off-shore drilling platform break-ups, aircraft aborted take-off, crash landings or other aircraft emergencies it is necessary to disembark the passengers as quickly as possible using inflatable escape slides.

In the ordinary deployment of an escape slide from an aircraft, the slide is deployed from a stored condition such as a folded chute or some similar compacted condition that is mounted on the inside or interior portion of the egress door or adjacent to such door. The upper end of the escape slide includes a girt bar that encompasses a girt bar that is secured to brackets mounted inside the egress door. As the door is opened for emergency use the escape slide is automatically or manually actuated for deployment through the open doorway or egress door and inflated to an escape slide between the egress door and the ground.

During such deployment, the initial stages of deployment are critical as the escape slide lacks sufficient body to permit its exact positioning for as it unfolds it hangs generally downwardly from the aircraft and its toe end may come to rest directly beneath the egress door. Depending on the forces of the wind, the lower end portion of the slide being inflated may be pushed askew to one side or beneath the egress door of the aircraft and as the escape slide is further inflated, the slide may be retained or locked into its skewed position thus rendering it useless for its designed purpose. These problems have been exacerbated by increasing the size of aircrafts thus increasing the distance substantially for the deployment of these escape slides.

Attempts to stabilize the escape slides have used inflatable positioning tubes on the underside of the slide that abut the fuselage of the aircraft as well as the slide. These positioning tubes do not solve the problem as they tend to merely push the escape slide outward of the fuselage and the escape slide can still be misdirected as by twisting or rotating as well as permitting lateral displacement of the lower portion of the slide. Other attempts have used containers to implement deployment but these devices increase the weight factor, an undesirable alternative. Shear pins have been used as release restraints but this requires a certain predetermined build up of force before release can be made thus requiring a preselected point of complete release, which has the disadvantage of assuming all factors are evenly predictable which they are not.

The present invention provides for the continuous control of the deployment of the slide as it inflates to its necessary point of deployment where the risk of misdirection is eliminated. The escape slide in its deployment is allowed to proceed in its desired direction of deployment by releasing a webbing or cord material that controls the rate of release and unfolding of the slide by braking the release of such webbing or cord. Webbing as used encompasses the meaning of a strong narrow strip such as webbing or cord or a long narrow strip of fabric. The braking force is a controlled release for the full length of its use and represents one that is adjustable to yield at a precise rate of release versus a point of release alone as in a shear pin control. Further, since the controlled release is gradual and continuous, the pull forces required to effect the release is substantially less than for conventional restraints, thus providing for a more efficient inflation system. A further advantage of the present invention is that the release is not an instantaneous event such as shearing a pin and is more tolerant of variation in the pull forces of deployment. The control deployment device of the instant invention is that it is reusable providing a cost advantage. The present invention eliminates a pressure drop in the inflating of the tubes which does occur where conventional frangible restraint devices are used thus yielding improved deployment behavior and consistency particularly in windy conditions.

SUMMARY OF THE INVENTION

The invention is directed to an inflation system for inflating and controlling the deployment of an escape slide from a structure such as an aircraft. The escape slide has an inboard end and a toe end. The slide is made up of a plurality of tubes and a sliding surface for use from an elevated egress on such structure, which structure has means for supporting the inboard end of the slide. Inflation means is used to inflate the tubes in cooperation with a restraining control device that has a webbing wound thereon with the outermost end portion of the webbing connected to an outboard portion of the slide (remote from the inboard end) and with the housing of the control device secured either to the inboard end of the slide or to the egress portion of the structure. The control device is operative upon pressurization of the tubes to deploy and extend the outboard portion and the toe end of the slide by unwinding the webbing under the force of inflation while braking such unwinding of the webbing at a controlled rate to effect controlled deployment of the slide.

BRIEF DESCRIPTION OF THE DRAWINGS

In the drawings:

FIG. 6 is a cross-sectional view of a modified inflatable escape slide;

FIG. 7 is a fragmentary plan view of the upper section only of the modified escape slide shown in FIG. 6 fully deployed with dual restraint control devices having their webbing fully extended;

DETAILED DESCRIPTION

Figure 1:
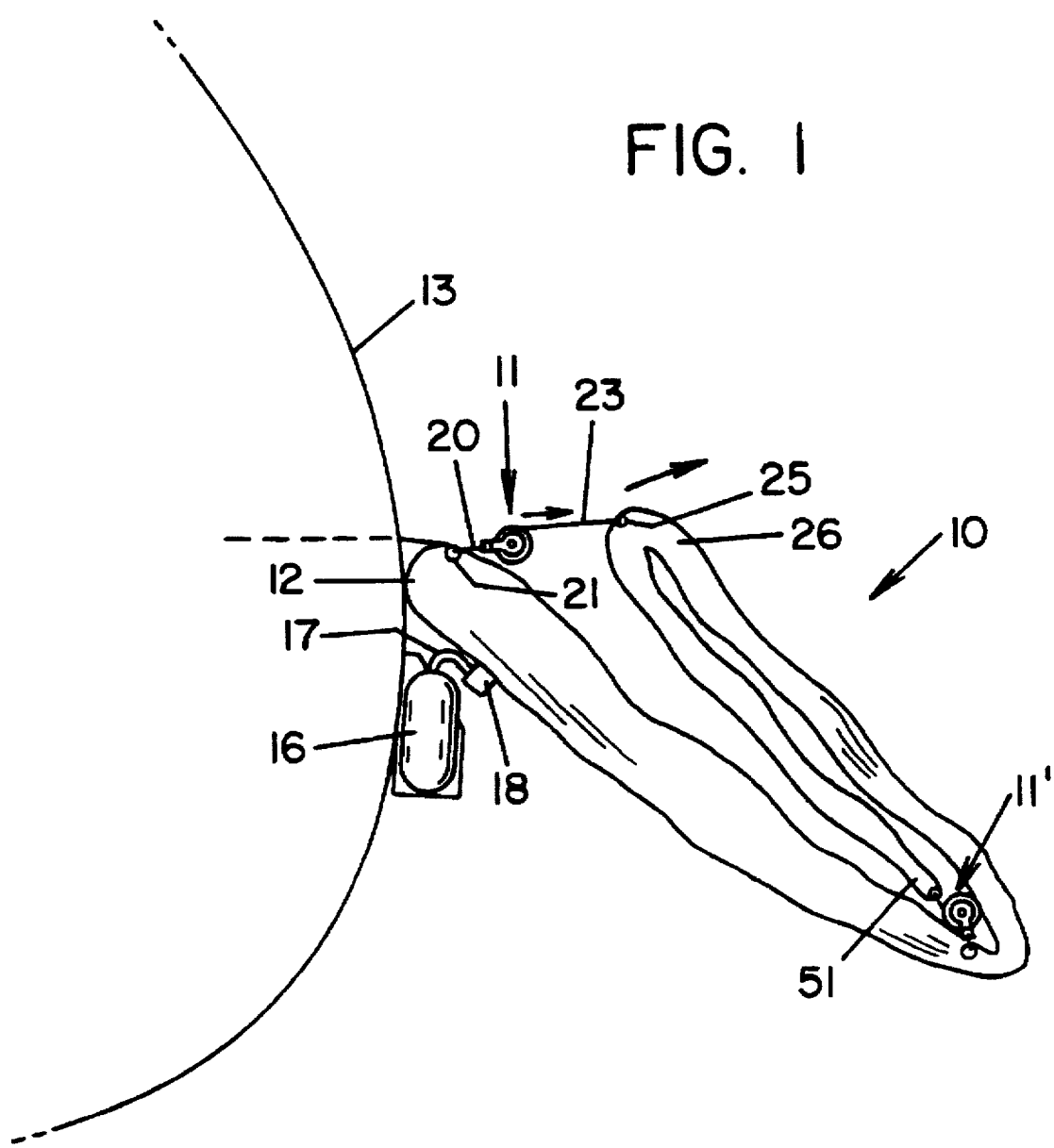
FIG. 1 is a side elevational view of an inflatable emergency escape slide, partially inflated, illustrating a first restraining control device in place between portions of the slide at the beginning of its control.
Figure 2:
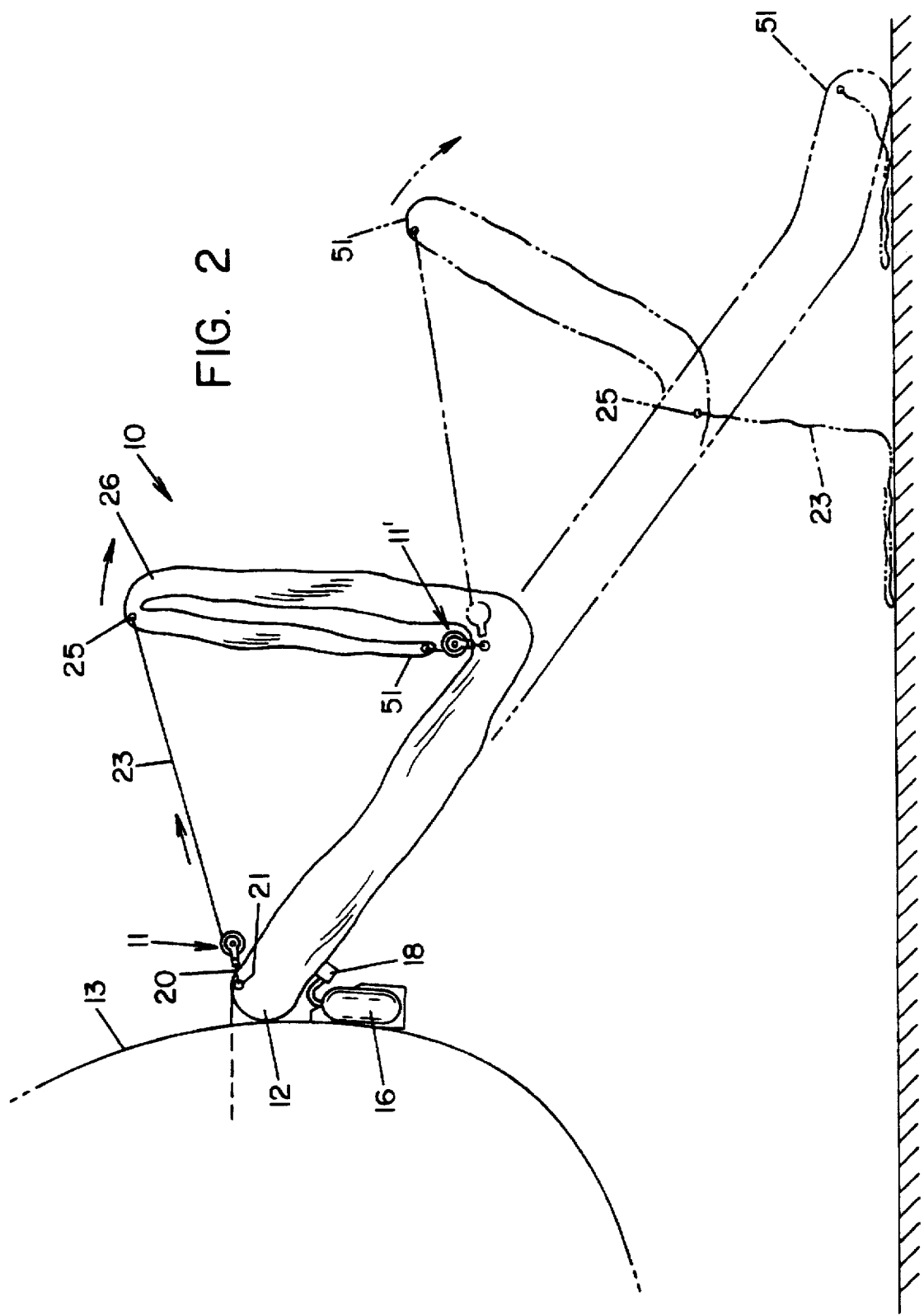
FIG. 2 is a side elevational view of the inflatable emergency escape slide, partially inflated, with a first restraining control device partially extended, with a second restraining device at the very beginning of its control and in phantom lines the second restraining control device in its operation to restrict and control deployment of the escape slide.

Referring now to the drawings wherein like reference numerals designate like or corresponding parts throughout the several views, there is shown in FIG. 1 an inflatable emergency evacuation or escape slide 10, which escape slide is shown partially inflated and is under control of a restraining control device 11 to be described. The escape slide is basically a plurality of inflatable tube assemblies which are generally longitudinally extending and fastened together throughout their lengths on both sides of the slide by suitable bonding means along their common abutting surfaces and by a slide cover with a slide surface on the upper surface as is old and well known in the art. The escape slide 10 has its upper end or inboard end 12 suitably fastened as by means of a girt bar to the fuselage adjacent to the bottom of an egress door of the aircraft 13 as is well known in the art and forms no part of the invention, hence the attachment means is not further shown nor described herein.

A suitable source of pressurized gas or air, such as a container or bottle of compressed gas 16 is mounted either on the underside of slide 10 or on a bracket and is suitably deployed along with the escape slide 10 from the interior of the aircraft during an emergency. The bottle 16 is connected via conduit 17 to aspirators 18 located on each underside portion of the escape slide 10. Such conduit 17 may be Y-shaped to have a single connection to the bottle 16 and the two respective branches connected to the aspirators 18 (only one shown).

The inflatable escape slide 10 is shown in FIG. 1 in a partially inflated condition with the restraining control device 11 having one end suitably attached as by a strap 20 to a suitable structure within the aircraft as to the girt bar or to a patch 21 at the head end or inboard end 12 of the escape slide 10. Restraining or restrain as used herein means (1) to restrict or keep under control (2) to hold back by force or tension and means keeping under control by holding back which is in contradistinction to a sudden and complete separation as a release or freeing from confinement as by a shear pin. The other end of the control device 11 is attached via its webbing 23 to a patch 25 which in turn is attached to the bottom or underneath outboard or intermediate portion 26 of the escape slide 10. The webbing 23 is wound onto a cylindrical hub 28 of a spool 29, which spool 29 is journaled for rotation on axle members 30-31. Spool 29 has two axially spaced and radially extending annular side portions 33 with each side portion having an exterior annular surface 34 and an interior annular surface 35, which exterior annular surface 34 has an annular recess 36 that receives annular friction brake pads or discs 37. Axle member 30 is axially aligned with axle member 31 to form a single axle. Mounted on one side of spool 29 is a torque plate 38 (FIG. 3) having a lower annular portion 39 that extends axially inwardly at its center portion to form the axle member 30 and a radially outwardly extending portion that curves axially to overlie an outer portion of the spool 29 and then a portion 40 that extends radially outwardly for connection to the strap 20, which strap 20 is connected to the patch 21 on the inboard end 12 of the slide. Mounted on the other side of spool 29 is a second torque plate 42, similar in shape to the torque plate 38. Torque plate 42 has a (generally) lower annular portion 43 that extends axially inwardly at its center position to form the axle member 31, that is coaxial with axle member 30. Torque plate 42 has a radially outwardly extending portion 44 that curves axially inwardly to overlie an outer portion of spool 29 and also is received by a bore 45 in the first torque plate 38. As seen in FIG. 4, the torque plate 42 has the lower annular or circular portion 43 and a narrower rectangular portion above it that extends outwardly or upwardly (as viewed in FIG. 4) to have a shape like a paddle. Torque plate 38 and torque plate 42 define a stationery housing for the spool 29. Axle member 31 of plate 42 has a central bore 46 therethrough that is in alignment with a threaded bore 47 in the axle member 30 to receive a threaded bolt 48. The respective outer annular surfaces of the annular friction discs 37 are in abutting contact with the inner circumferential surfaces 49 and 50 of annular portions 39 and 43 of torque plates 38 and 42 respectively, acting as braking means for the rotative spool 29. Screw 48 is used to adjust the spacing between plates 38 and 42 which in turn adjusts the clamping force of these plates on the friction braking discs 37 thus affecting the amount of force needed to separate the webbing 23 from the spool 29 as the inflatable tubes are pressurized. The clamping force and the overall length of the webbing are adjusted to provide the desirable deployment results. The length of the webbing depends on the folded lengths of the inflatable sections while the width of the webbing may be made smaller if the length of the webbing is relatively short. The control device 11 controls the deployment sequence of the folded tubes such that sufficient pressure builds up to cause a load to be applied to the webbing 23 causing the webbing to unroll from the spool. Unrolling of the webbing 23 from the spool 29 permits the controlled extension of the inflated tubes until the full extension of the length of webbing occurs, at which time the webbing 23 pulls free from the spool 29 resulting in the full release of the particular fold being restrained.

To ensure further control of the folded inflatable tubes, a second restraining control device 11' is located between the toe end 51 of the escape slide and a portion of the slide that is between the head end 12 and the intermediate portion of the slide where patch 25 is located. Such control device 11' as shown is identical to the control device 11 previously described both in structure and function, although its size can be smaller in dimension if the function requires it. The number of control devices used may be varied and the number of folds in the escape slide may be varied in accordance with the need for desired control. On smaller overall lengths of escape slides a single restraining control device may be sufficient.

Figure 3:
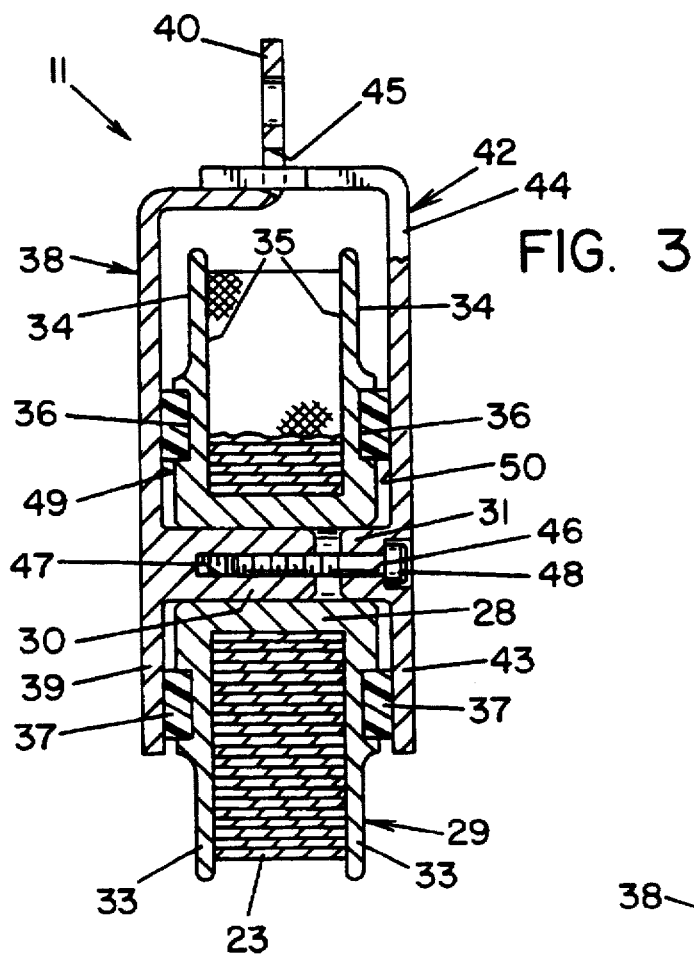
FIG. 3 is an enlarged front view of the restraining control device in cross section showing the device in greater detail with a portion of the webbing in full.
Figure 4:
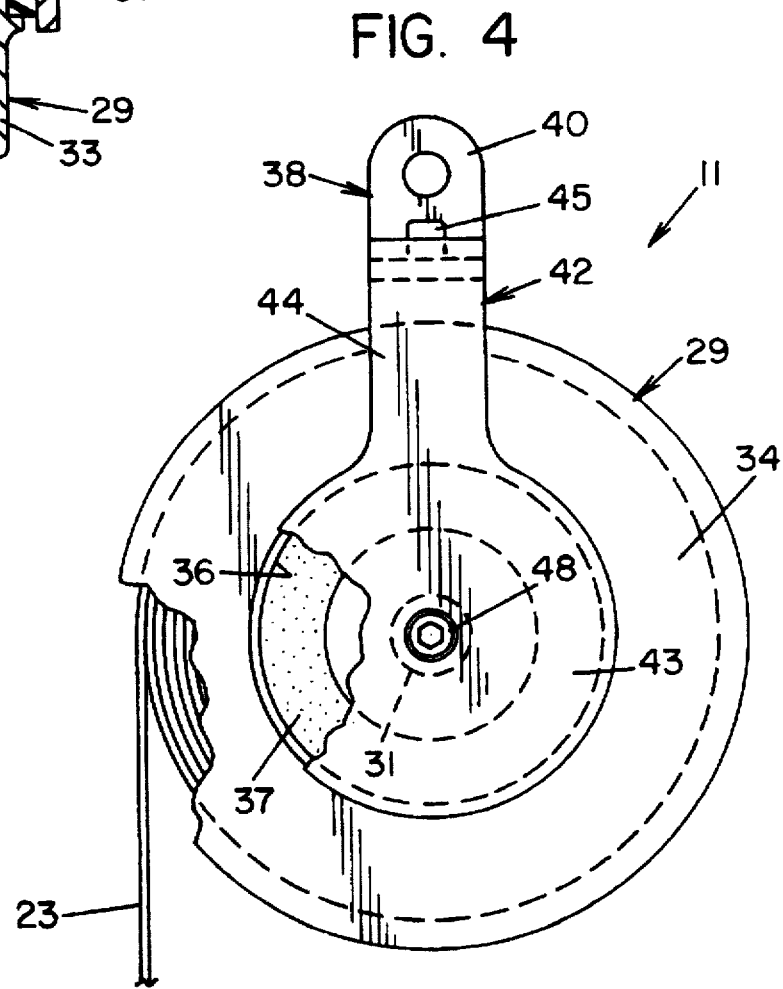
FIG. 4 is a side elevational view of the restraining control device with a portion broken away to illustrate the webbing.
Figure 5:
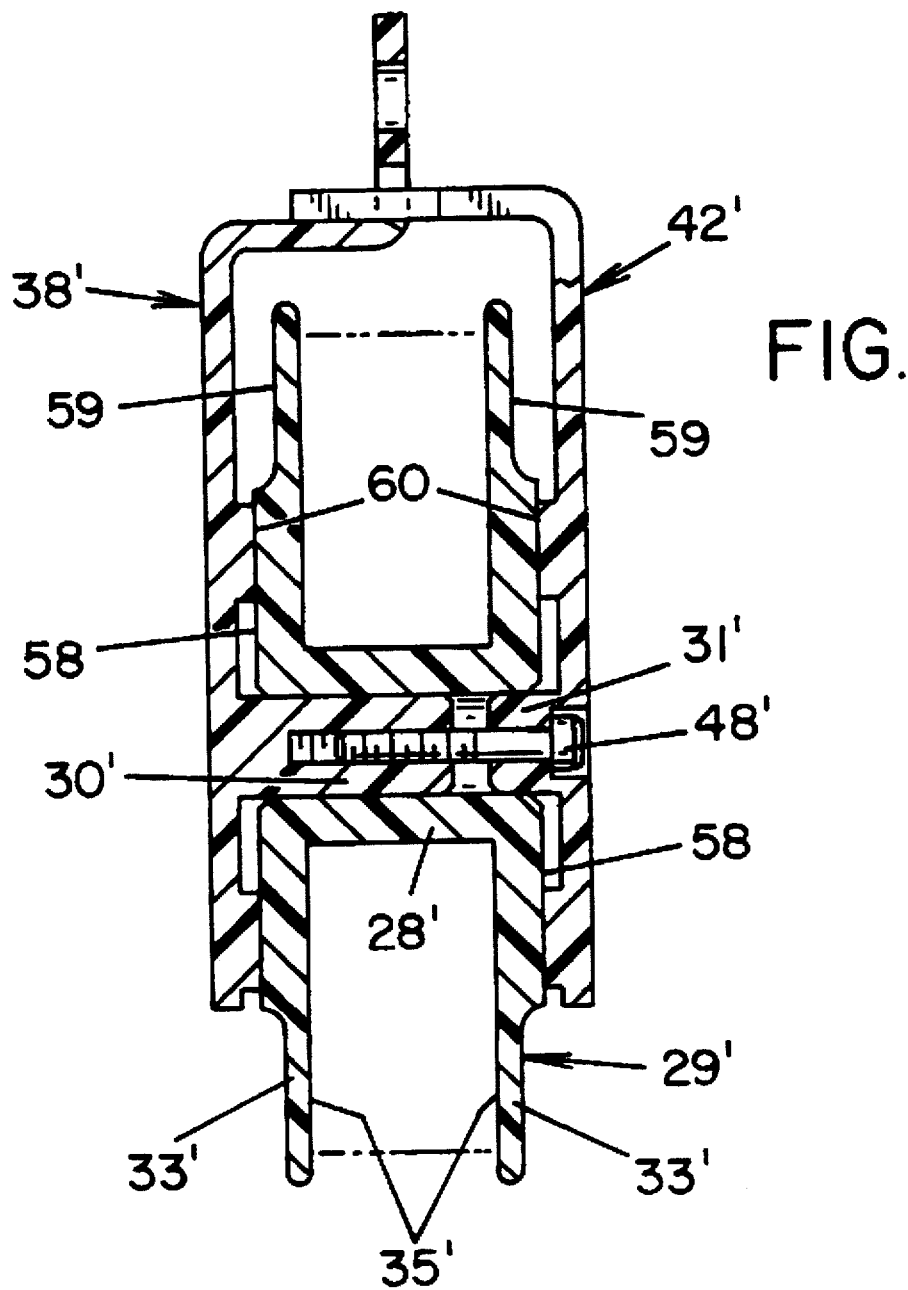
FIG. 5 is a front elevational view in cross section of a modified restraining control device without the webbing wound thereon.

A modification of the spool 29 and the torque plates construction is shown in FIG. 5 with the numerals of similar elements as described in the first embodiment of FIGS. 3 and 4 being primed. A spool 29' has a cylindrical hub 28' and two axially spaced annular side portions 33'. Each side portion 33' has an interior planar annular surface 35' and an exterior surface. The exterior surface of such side portions 33' has an inner annular portion 58 and an outer annular portion 59. The inner annular portion 58 is thicker in dimension than the outer annular portion 59.

As in the first described embodiments of FIGS. 3 and 4, the spool 29' has a torque plate 38' and 42' mounted on each side of the spool with similar axle members 30' and 31' which are adjustable axially toward and away from each other via a threaded bolt 48' to adjust the spacing of the torque plates 38' and 42'. The inner circumferential surfaces of torque plates 38' and 42' have annular inwardly projecting abutments 60 that come into abutting and frictional engagement with the inner annular portions 58 of the spool 29' to act as braking surfaces for the unwinding of webbing that is wound thereon as described in the first embodiment. The spool 29' and the housing that contains the torque plates 38' and 42' are made of fiber reinforced plastic and eliminates the need for the annular friction brake pads 37.

The invention has been described with the control devices 11 interconnecting certain portions of the escape slide and with the number of control devices used being dependent on the number of folds and the number of sections of the escape slide to be controlled. In addition the control device 11 and 11' have been shown as interconnecting two selected portions of the escape slide. The invention also contemplates using two control devices as 11 and 11' interconnecting opposite sides selected portion of the escape slide with both control devices acting in parallel and simultaneously as illustrated in FIGS. 6 and 7. Shown therein is an escape slide consisting of an upper section and a lower section that are secured or bonded together to form a unitary slide 70. The upper section of the slide 70 has a pair of longitudinally extending laterally spaced inflatable tubes or tube members 74 and 76. Such tubes 74 and 76 form guides or guide rails to help evacuees to remain on the escape slides. Such guides act as side portions for the slide. The lower portion of the slide 70 has a plurality of longitudinally extending tube members 77, 78, and 79 interconnected by laterally extending tube members with only tubes 80 and 81 shown in FIG. 6. The escape slide 70 has a panel members 82 extending across the full length of the upper portion and is sandwiched between the respective tubes 74, 76 and 77, 78 and 79 prior to the bonding of such upper and lower sections together to form a slide member.

As in the first embodiment escape slide 70 is fabricated from an air impervious preferably rubber coated material such that panel member 82 cooperates with the respective tube members (74, 76, 77, 78 and 79) and the laterally extending tube members to provide a slide member that is generally rectangular in plan view.

The escape slide 70 has an upper end or inboard end 84 that is suitably fastened to the fuselage of the aircraft as previously described and a lower end or toe end 85. Suitable pressurized means as a bottle of pressurized fluid and an aspirator or aspirators are used to pressurize the slide as is old and well known in the art. Each side of the upper end of the escape slide 70 has a restraining control device 11 mounted thereon. The strap of one control device 11 is secured via a patch 90 to the upper end of inflatable tube 74 and the other end of such control device 11 is secured via its webbing 23 to a patch 91 on the bottom or underneath portion of an outboard portion of the tube 77 of the escape slide. The strap of the other control device 11 is secured via a patch 95 to the upper end of inflatable tube 76 and the other end of such control device 11 is secured via its webbing 23 to a patch 96 on the bottom or underneath portion of an outboard portion of the tube 79. As depicted by these drawings the webbings 23 have one end just released from the respective spools of the control devices 11 and with the other ends of the webbings 23 still secured to the respective patches 91 and 96.

A second set of restraining control devices 11' identical to control devices 11 are mounted on the upper side tubes 74 and 76 approximately midway between the upper end 84 and the toe end 85. Such control devices 11' may be smaller than control devices 11 where their force retarding function is desirably less. The strap of one control device 11' is secured via a patch 90' to the intermediate center portion of inflatable tube 74 and the other end of such one control device 11' is secured via its webbing 23' to a patch 91' on the underneath portion of the toe end of tube 77 of escape slide 70. The strap of the other control device 11' is secured via a patch 95' to the intermediate center portion of inflatable tube 76 and the other end of such control device 11' is secured via its webbing 23' to a patch 96' on the underneath portion of the toe end of tube 79. As depicted by these drawings the webbings has the uppermost one ends just released from the respective housings of control devices 11' and the other ends of the webbings 23' secured to the respective patches 91' and 96' at the toe end.

The operation of this embodiment is substantially identical to that described in the first embodiment except that with dual or two sets of control devices, the deployment of the escape slide is more controlled and the forces developed are evenly controlled. While the embodiment described in FIGS. 6 and 7 has two sets of control devices 11 & 11; one of the upper control devices 11 can be eliminated to obtain good results in deployment.

The above described control devices provide a more gradual and controlled release of the inflatable folds and the deployment of the slide than conventional frangible restraint devices, which control the release of the folds and the deployment of the slide only at a given force, which is an instantaneous release, and are then inactive while the control devices 11 and 11' act over their entire length of paying out the webbing and by comparison is a controlled release.

Figure 8:
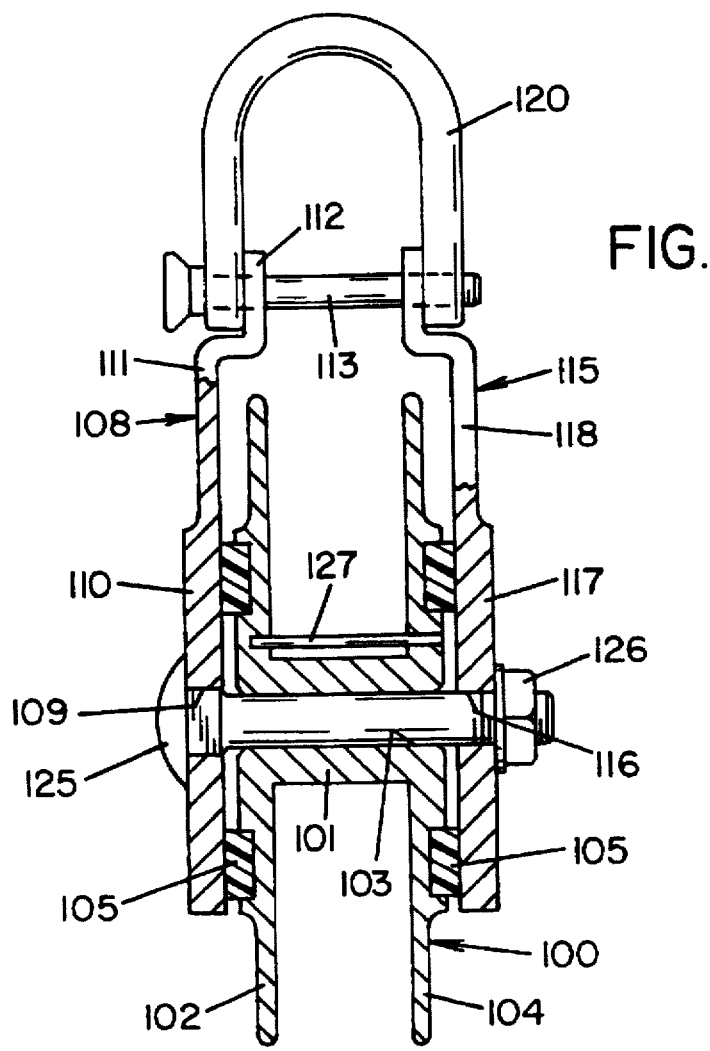
FIG. 8 is an enlarged front view of another modified restraining control device in cross-section without the webbing.
Figure 9:
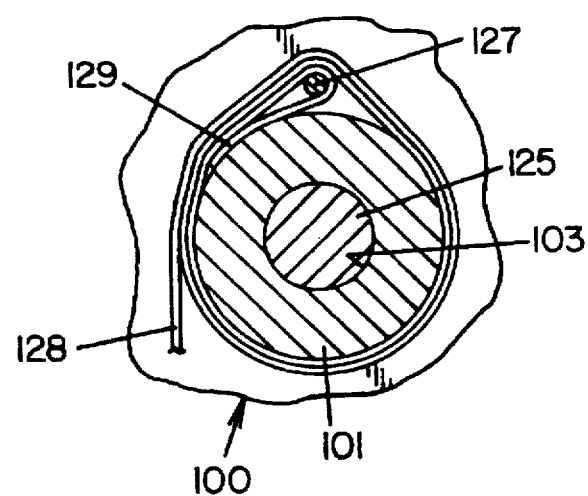
FIG. 9 is a fragmentary side elevational view of the modified restraining control device of FIG. 8 showing a pin and a portion of the webbing to illustrate the anchoring of the webbing by the pin.

A further modification of the spool is shown in FIGS. 8 and 9 wherein a spool 100 has a cylindrical hub 101 and two axially spaced annular side portions 102 and 104. Each side portion has an interior planar annular surface and an exterior surface, which exterior surfaces are recessed as in the first described embodiment to receive annular friction brake pads or discs 105. Cylindrical hub 101 has a central bore 103 for a purpose to be described.

Mounted on one side of spool 100 is a torque plate 108 that in side elevational view is a paddle shape similar to the paddle shape of torque plate 42 in FIG. 4. Torque plate 108 has a central bore 109, a central annular portion 110 and a radially outwardly extending portion 111 whose outer portion 112 has a bore that receives a clevis pin 113.

Mounted on the other side of spool 100 is a torque plate 115 that in side elevational view is also paddle shaped similar to torque plate 108. Torque plate 115 has a central bore 116 in its central annular portion 117 that has a radially outwardly extending portion 118 similar to radially outwardly extending portion 44 of torque plate 42 as shown in FIG. 4. The outer end portion of radial outwardly extending portion 118 has a bore in alignment with the bore on the outermost portion of radially outwardly extending portion 111 to receive the other end of clevis pin 113 of clevis 120 that is suitably connected to a strap such as strap 20 for connection to a patch for anchoring such device to the desired location on the escape slide as previously described.

A carriage bolt 125 extends through the central bore 103 of hub 101 (spool 100) and through bores 109 and 116 of the respective torque plates 108 and 115. Tightening of the nut 126 on the threaded end portion of carriage bolt 125 brings the respective brake discs 105 on the sides of spool 100 into abutting engagement with the central annular portions 110 and 117 of torque plates 108 and 115 respectively. Such tightening of a nut 126 on carriage bolt 125 is used to adjust the clamping force of these torque plates on the friction braking discs 105 thus affecting the amount of force needed to separate the webbing from the spool 100 as the inflatable tubes are pressurized as previously described.

Spool 100 has an axially extending pin 127 located closely adjacent to its hub 101 and lying parallel to the axis of such hub, with the respective ends of such pin 127 press fitted into the annular side portions 102 and 104 respectively. Webbing 128 has an end portion 129 wrapped around such pin 127 to anchor such webbing as it is wound around the hub 101 of spool 100.

The operation of this spool is identical to the above described embodiments however its construction is more simple and more economical.

It will be apparent that, although a specific embodiment and certain modifications of the invention have been described in detail, the invention is not limited to the specifically illustrated and described constructions since variations may be made without departing from the principles of the invention.

What is claimed is:

1. In an inflatable escape slide having an inboard end and an outboard portion, said slide having a panel member supported by a plurality of inflatable tubes to provide a sliding surface from an elevated egress, inflation means operative upon actuation to provide pressurized fluid to said tubes to inflate said tubes to form an extended slide, a restraint control device interconnecting said inboard end and said outboard portion of said escape slide, and said control device operative upon pressurization of said tubes by said inflation means to deploy said outboard portion relative to said inboard end at a continuously controlled rate from the initial pressurization of said tubes to the deployment for a length of said slide that extends from said inboard end to said outboard portion.

2. In an inflatable escape slide as set forth in claim 1 wherein said continuous restraint control device has braking means operative to control said rate of deployment.

3. In an inflatable escape slide as set forth in claim 2 wherein said braking means is adjustable to provide said controlled rate.

4. In an inflatable escape slide as set forth in claim 3 wherein said control device has a webbing that interconnects via said control device said inboard end to said outboard portion and continuously controls said rate of deployment as said tubes are inflated from said inboard end to said outboard portion, and said control device is rendered inoperative upon completion of the unwinding of said webbing for its full length.

5. In an inflatable escape slide as set forth in claim 2 wherein said braking means comprises a spool rotatably journaled in a housing, said housing being attached to said inboard end of said slide, webbing wound onto said spool and having one end secured to said outboard portion, friction braking means on said spool frictionally engaging said housing upon rotation of said spool relative to said housing to pay out said webbing in response to a force generated by pressurizing said inflatable tubes.

6. In an inflatable escape slide as set forth in claim 5 wherein said housing includes a pair of spaced plates, adjusting means interconnecting said plates for adjusting the axial distance of said plates against said spool to effect the braking action of said spool relative to said housing.

7. In an inflatable escape slide as set forth in claim 5 wherein said housing includes a pair of spaced plates, said plates having axially aligned and axially spaced axle members that support said spool for rotation, said axle members having means to adjust their axial spacings to control the frictional contact between said braking means on said spool and said housing.

8. In an inflatable escape slide for an airplane structure, said slide having an inboard end and an outboard portion, said escape slide having a plurality of inflatable tubes and a sliding surface for use from an elevated egress on such airplane structure, means for supporting said inboard end at said structure, inflation means operative upon actuation to provide pressurized fluid to said tubes to inflate said tubes to form a longitudinally extending slide, a frictional control device mounted on said inboard end of said slide adjacent to said egress on said airplane structure, said control device having a webbing wound thereon with the outermost end portion of said webbing connected to said outboard portion, said control device operative upon initial pressurization of said tubes to deploy said outboard portion relative to said inboard end by the unwinding of said webbing, and said control device having the rate of deployment of a given length of said slide, and each of said control devices rendered inoperative upon completion of its controlled length of deployment.

9. In an inflatable escape slide as set forth in claim 8 wherein said braking means is adjustable to regulate the controlled deployment of said escape slide.

10. In an inflatable escape slide as set forth in claim 9 wherein said control device includes a spool upon which said webbing is wound, said spool having a hub with spaced annular sides, said control device having a pair of spaced plates, braking disc means on each of said annular side frictionally engaging said plates, and adjusting means interconnecting said plates to adjust the braking action between said brake disc means and said plates to control the rate of unwinding of said webbing as said tubes are inflated.

11. In an inflatable escape slide as set forth in claim 8 wherein said control device includes a spool upon which said webbing is wound, said spool having a hub with spaced annular side surfaces, said control device having a housing with a central axle means for rotatably journaling said hub, said side surfaces of said hub frictionally engaging portions of said housing to provide said braking means for the resisting of the unwinding of said webbing.

12. In an inflatable escape slide as set forth in claim 11 wherein said housing and said spool are made of fiber reinforced plastic.

13. In an inflatable escape slide as set forth in claim 8 wherein said control device includes a spool with a hub, said hub having a through bore and a pair of annular sides, said spool has said webbing wound thereon, said hub having annular friction brake discs mounted on said annular sides, said control device having a housing with a central axle means for rotatably journaling said hub, and said annular friction braking means frictionally contacting and abutting said housing to provide a braking force upon unwinding of said webbing.

14. In an inflatable escape slide as set forth in claim 13 wherein said axle means is a pair of axially aligned axle members, one of said axle members has a through bore, the other one of said axle members has a threaded bore aligned with said bore of said one member, said housing including a pair of spaced plates, each of said spaced plates contains one of said axle members, and a threaded member contained in said bore and threadedly engaged in said threaded bore of said other one of said axle members for adjusting the braking action.

15. In an inflatable escape slide having an inboard end, an outboard portion and a toe end; said slide having a plurality of inflatable tubes and a panel member that extend in a longitudinal direction providing a sliding surface from an elevated egress; inflation means operative upon actuation to provide pressurized fluid to said tubes to inflate said tubes to form said slide; at least a pair of restraint control devices interconnecting certain portions of said slide; one of said control devices interconnects said inboard end and an intermediate portion of said slide; the other one of said control devices interconnects said toe end and another portion of said slide; said another portion of said slide being located between said inboard end and said intermediate portion of said slide; said other one of said control devices operative after completion of operation of said one control device; and said control devices operative to continuously control restrained deployment of said escape slide into its full longitudinal length by maintaining a restraining force during deployment.

16. In an inflatable escape slide as set forth in claim 15 wherein each of said control devices has braking means that is operative to control and restrain the rate of deployment of a given length of said slide, and each of said control devices rendered inoperative upon completion of its controlled length of deployment.

17. In an inflatable escape slide as set forth in claim 16 wherein each of said braking means is adjustable to control the rate of deployment thereby.

18. In an inflatable escape slide having an inboard end and a toe end, said slide having an outboard portion located between said inboard end and said toe end, said slide having a plurality of inflatable longitudinally extending tubes with laterally spaced side portions that define a first side portion and a second side portion, each side portion extends from said inboard end to said toe end, inflation means operative upon actuation to pressurize and inflate said tubes to form said slide, a first control device mounted on said first side portion interconnecting said inboard end on said first side portion to said outboard portion on said first side portion, a second control device mounted on said second side portion interconnecting said inboard end on said second side portion to said outboard portion on said second side portion, and said control devices operative upon pressurization of said tubes to deploy said outboard portion relative to said inboard end at a continuously controlled rate of deployment for a length of said slide that extends from said inboard end to said outboard portion.

19. In an inflatable escape slide for an aircraft having an inboard end located adjacent an egress door of an aircraft and an outboard portion, said outboard portion located remotely from said inboard end, said slide having a plurality of inflatable tubes and a slide panel to provide a sliding surface upon inflation of said tubes, inflation mean operative upon actuation to provide pressurized fluid to said tubes adjacent to said inboard end for distending said tubes to form a longitudinally extending slide with laterally spaced guides, two control devices mounted on said escape slide, each of said control devices having a housing and a spool, said spool journaled in said housing for rotation, a webbing wound onto each of said spools, one control device mounted on each of said guides adjacent to said inboard end, said housings of each control device secured to said inboard end of said slide, each control device having a braking means to frictionally control the unwinding of said webbing from said spool, and each webbing having its outermost end secured to one of said guides at said outboard portion to control the deployment of said outboard portion relative to said inboard end.

* * * * *